(12) United States Patent
Hill et al.

(10) Patent No.: US 11,326,835 B2
(45) Date of Patent: May 10, 2022

(54) IN-FEED HOPPER AND METER FOR CARBON-BASED FEEDSTOCK PROCESSING SYSTEM

(71) Applicant: Clean Energy Technology Association, Inc., Fairfield, TX (US)

(72) Inventors: Roy W. Hill, Fairfield, TX (US); Jerry Scott Long, Fairfield, TX (US); Tracy Thompson, Fairfield, TX (US)

(73) Assignee: CLEAN ENERGY TECHNOLOGY ASSOCIATION, INC., Houston, TX (US)

( * ) Notice: Subject to any disclaimer, the term of this patent is extended or adjusted under 35 U.S.C. 154(b) by 644 days.

(21) Appl. No.: 16/210,825

(22) Filed: Dec. 5, 2018

(65) Prior Publication Data

US 2019/0107329 A1  Apr. 11, 2019

Related U.S. Application Data

(62) Division of application No. 14/602,651, filed on Jan. 22, 2015, now Pat. No. 10,180,284.

(51) Int. Cl.
| | |
|---|---|
| A62D 3/00 | (2006.01) |
| A45D 24/22 | (2006.01) |
| B02C 11/08 | (2006.01) |
| F27D 3/10 | (2006.01) |
| B65G 65/48 | (2006.01) |
| B01J 8/00 | (2006.01) |
| C10B 53/02 | (2006.01) |
| C10B 53/04 | (2006.01) |

(52) U.S. Cl.
CPC .............. *F27D 3/10* (2013.01); *B01J 8/0045* (2013.01); *B65G 65/4881* (2013.01); *B01J 2208/00752* (2013.01); *B01J 2208/00778* (2013.01); *C10B 53/02* (2013.01); *C10B 53/04* (2013.01)

(58) Field of Classification Search
CPC ......... B02C 11/04; B02C 17/00; B02C 21/00; B65G 53/4633; A47G 19/34; B03B 9/06; A61L 11/00; B67D 7/163
USPC .............. 222/197, 1, 217, 367, 370; 241/23; 588/229; 422/309
See application file for complete search history.

(56) References Cited

U.S. PATENT DOCUMENTS

| | | | | |
|---|---|---|---|---|
| 3,353,723 A | * | 11/1967 | Karl-Heinz | .............. D21C 7/06 222/368 |
| 4,828,145 A | | 5/1989 | Raufast | |
| 5,230,872 A | | 7/1993 | Tiggelbeck et al. | |

(Continued)

*Primary Examiner* — Monzer R Chorbaji
(74) *Attorney, Agent, or Firm* — Bracewell LLP; Douglas W. Rommelmann

(57) ABSTRACT

A meter for controlling the flow of feedstock from an in-feed hopper to a distillation unit, including a cylindrical roller having a first end, a second end, and an outer diameter, the roller defining a recess that extends helically substantially from the first end to the second end, a sleeve circumscribing a portion of the outer diameter of the cylindrical roller, the sleeve having an open first side that allows the passage of feedstock into the recess of the roller, and an open second side that allows the passage of feedstock out of the recess of the roller as the roller rotates relative to the sleeve, and a housing fixedly attached to the sleeve and capable of attachment to the in-feed hopper and the distillation unit such that feedstock must pass through the housing to get from the in-feed hopper to the distillation unit.

6 Claims, 6 Drawing Sheets

(56) References Cited

U.S. PATENT DOCUMENTS

| | | | |
|---|---|---|---|
| 5,427,738 A | 6/1995 | Galloway | |
| 6,523,726 B1 * | 2/2003 | Tschantz | B65G 47/19 222/342 |
| 8,535,125 B2 * | 9/2013 | Starke | G07D 9/00 453/57 |

\* cited by examiner

IN-FEED HOPPER AND METER FOR CARBON-BASED FEEDSTOCK PROCESSING SYSTEM

RELATED APPLICATIONS

The present application is a divisional application of and claims priority to and the benefit of U.S. application Ser. No. 14/602,651, filed Jan. 22, 2015, the entire disclosure of which is hereby incorporated herein by reference.

BACKGROUND OF THE INVENTION

1. Field of the Invention

The present invention relates to processing carbon-based feedstock, and in particular to an in-feed hopper and meter for feeding feedstock into a distillation chamber.

2. Description of the Related Art

Coal is an abundant natural resource capable of exploitation to produce large amounts of energy. Coal in its raw form, however, usually contains undesirable compositions in the form of a number of other chemical compositions or elements. One problem faced in the coal industry is that traditional means of extracting energy from coal have been the subject of concerns, due to possible adverse environmental consequences because of the undesirable compositions usually present in raw coal. For example, historically coal has been burned to create heat, such as to turn water into steam to power a turbine and generate electricity. This process generates large amounts of gaseous emissions containing small amounts of the undesirable compositions which harm the environment. As a result, the use of coal as an energy source can cause tension between the need for an economic way to produce energy on the one hand, and environmental concerns on the other.

During a typical coal processing operation, coal and other carbon-based products are often subjected to distillation processes in order to extract various products therefrom. Typically, the coal or other carbon-based feedstock is fed directly into a distillation chamber from open, atmospheric hoppers. The feedstock can pass through a meter as it enters the distillation chamber so that the volume of the feedstock entering the distillation chamber is known.

The use of open air hoppers can be problematic because the outside atmosphere contains oxygen. Accordingly, feedstock introduced to a distillation chamber from an open air hopper is often mixed with air containing oxygen. Many distillation processes, however, inhibit oxidation, or the burning of the feedstock during the distillation process, so that the presence of such oxygen in the distillation chamber is problematic.

In addition, much of the raw feedstock supplied to an in-feed hopper is first passed through a grinder, in order to reduce the size of individual units of feedstock so that the feedstock can pass through the hopper and meter more effectively. In some cases, however, pieces of feedstock are introduced to the hopper and meter that were not sufficiently crushed by the grinder, and that are large so that they cannot fit through the meter. Such large pieces of feedstock can become wedged in the meter, binding the meter so that it cannot continue processing the feedstock, and, in some instances, damaging the meter.

SUMMARY OF THE INVENTION

Briefly, the present invention provides a meter for controlling the flow of feedstock from an in-feed hopper to a distillation unit. The meter includes a cylindrical roller having a first end, a second end, and an outer diameter, the roller defining a recess that extends helically substantially from the first end to the second end. The meter also includes a sleeve circumscribing a portion of the outer diameter of the cylindrical roller. The sleeve has an open first side that allows the passage of feedstock into the recess of the roller, and an open second side that allows the passage of feedstock out of the recess of the roller as the roller rotates relative to the sleeve. In addition, the meter includes a housing fixedly attached to the sleeve and capable of attachment to the in-feed hopper and the distillation unit such that feedstock must pass through the housing to get from the in-feed hopper to the distillation unit.

In some embodiments, the meter can further include a wear plate having substantially the same length as the roller, and attached to the housing so that an edge of the wear plate is proximate an outer diameter of the roller to shear feedstock extending out of the recess as the roller turns. In addition, the second open side of the sleeve can have a helical opening corresponding in shape and size to the recess of the roller, so that when the recess of the roller aligns with the helical opening, the feedstock passes through the helical opening all at once into the distillation unit.

Furthermore, in certain embodiment of the invention, the distance between the outer diameter of the roller and the sleeve can be about ⅛ of an inch or less to help prevent the flow of gases from the distillation unit to the in-feed hopper. In addition, the recess in the roller can have a bottom and two sides, wherein the transverse cross-section of the recess is substantially U-shaped. Alternatively, the recess in the roller can have a bottom and two opposing sides, wherein the sides of the recess slope outwardly away from one another from the bottom of the recess to the outside diameter of the roller.

Another embodiment of the invention provides an in-feed hopper and metering system for introducing feedstock into a distillation unit. The system includes a first hollow chamber having a sealable inlet for receiving feedstock, a second hollow chamber attached to the first hollow chamber and having an outlet for discharging feedstock, and a sealing gate between the first hollow chamber and the second hollow chamber having an open and a closed position. The sealing gate separates the first hollow chamber from the second hollow chamber when in the closed position during filling and pressurization of the first hollow chamber. Alternately, the sealing gate joins the first hollow chamber and the second hollow chamber when in the open position, to allow passage of the feedstock from the first hollow chamber to the second hollow chamber. The system further includes a meter having a roller partially circumscribed by a sleeve, the roller having a helical recess that accepts feedstock from the second hollow chamber, and then discharges the feedstock to a distillation unit.

In certain example embodiments, the roller can have a first end, a second end, and an outer diameter, and the helical recess can extend substantially from the first end to the second end. In addition, the sleeve can have an open first side that allows the passage of feedstock into the recess of the roller, and an open second side that allows the passage of feedstock out of the recess of the roller as the roller rotates relative to the sleeve.

In some embodiments, the meter can also include a housing fixedly attached to the sleeve and capable of attachment to the in-feed hopper and the distillation unit, such that feedstock must pass through the housing to get from the in-feed hopper to the distillation unit. In addition, the meter can include a wear plate having substantially the same length as the roller, and attached to the housing so that an edge of the wear plate is proximate an outer diameter of the roller to shear feedstock extending out of the recess as the roller turns. Furthermore, the second open side of the sleeve can include a helical opening corresponding in shape and size to the recess of the roller so that when the recess of the roller aligns with the helical opening, the feedstock passes through the helical opening all at once into the distillation unit.

Yet other embodiments of the system may include a meter wherein the distance between the outer diameter of the roller and the sleeve is about ⅛ of an inch or less to help prevent the flow of gases from the distillation unit to the in-feed hopper. The recess in the roller can have a bottom and two sides, wherein the transverse cross-section of the recess is substantially U-shaped. Alternatively, the recess in the roller can have a bottom and two opposing sides, wherein the sides of the recess slope outwardly away from one another from the bottom of the recess to the outside diameter of the roller.

Another embodiment of the invention provides a method of providing feedstock to a distillation unit. The method includes the steps of filling a first hollow chamber with feedstock through an inlet in the first hollow chamber, sealing the inlet of the first hollow chamber, pressurizing the first hollow chamber until the pressure within the first hollow chamber is about equal to the pressure inside a second hollow chamber, and opening a passage between the first hollow chamber and the second hollow chamber so that the feedstock can pass from the first hollow chamber to the second hollow chamber. In addition, the method includes the step of discharging the feedstock from the second hollow chamber into a feed meter having a roller with a recess, the roller designed to accept feedstock into the recess, rotate the feedstock away from the second hollow chamber, and discharge the feedstock to a distillation unit.

Some embodiments of the method can include the steps of purging oxygen from the first hollow chamber, and replacing the oxygen in the first hollow chamber with nitrogen. In addition, the method can include shearing fragments of the feedstock with a wear plate located adjacent the roller in the meter to a size that fits within the recess of the roller, and discharging the feedstock from the meter into the distillation unit evenly to prevent the feedstock from massing inside the distillation unit.

DETAILED DESCRIPTION OF THE PREFERRED EMBODIMENTS

Figure 1:
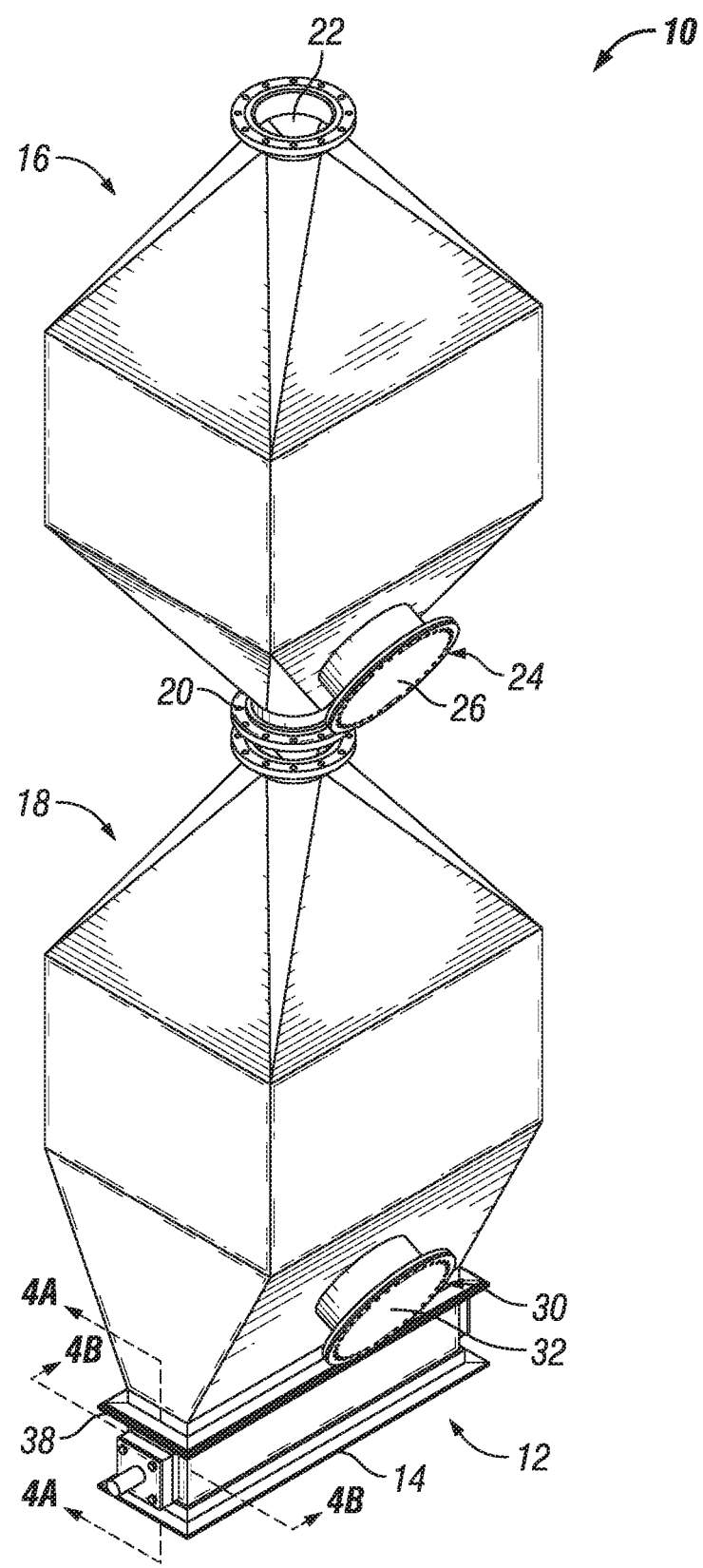
FIG. 1 is perspective view of an in-feed hopper and meter according to an embodiment of the present invention.

In FIG. 1, there is depicted a perspective view of an infeed hopper 10 attached to a feed meter 12. The feed meter 12 is designed to be attached at a lower end 14 to a distillation chamber (not shown) where feedstock from the infeed hopper 10 will be processed. The infeed hopper 10 includes an upper hopper portion 16 and a lower hopper portion 18. The upper hopper portion 16 is separated from the lower hopper portion 18 by a sealing gate 20. The sealing gate 20 is capable of adjustment between an open position and a closed position. When in the open position, an opening between the upper hopper portion 16 and the lower hopper portion 18 is created, so that feedstock can pass from the upper hopper portion 16 into the lower hopper portion 18. Alternately, when the sealing gate 20 is in the closed position, the upper hopper portion 16 is separated from the lower hopper portion 18.

Figure 2:
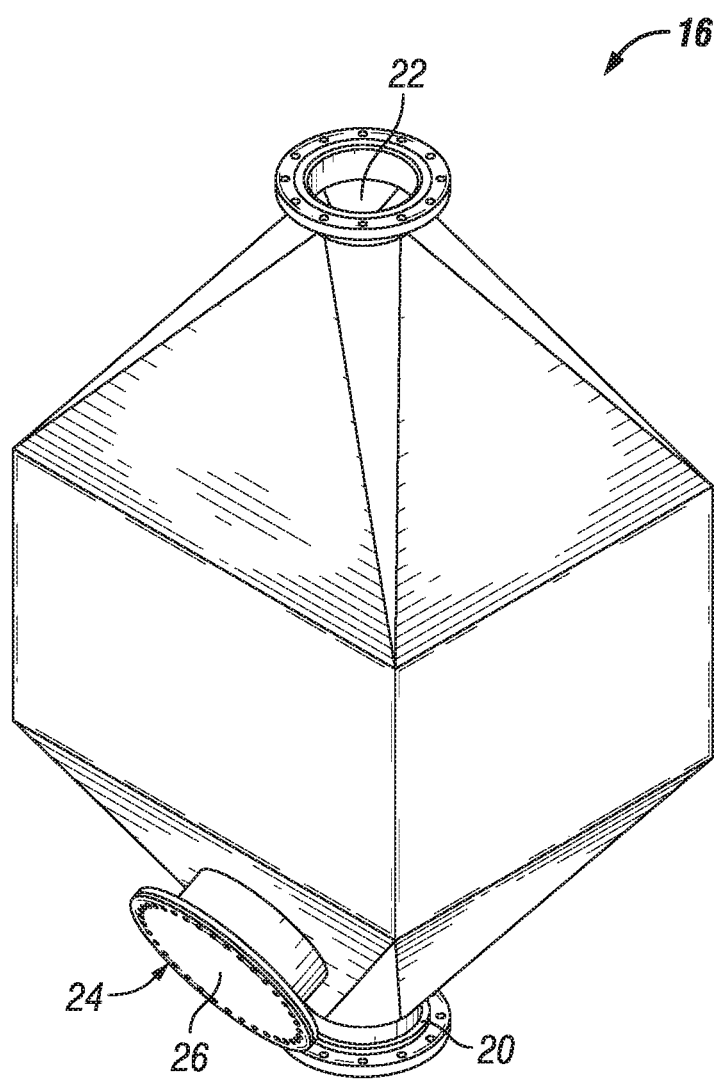
FIG. 2 is a perspective view of an upper portion of the infeed hopper of FIG. 1.

Referring to FIG. 2, there is shown an upper hopper portion 16, including an upper hopper inlet 22 and an upper access port 24. The inlet 22 is used to receive feedstock into the upper hopper portion 16, and, although shown to be round, could be any suitable shape and diameter. The upper access port 24 includes a cover 26 that can be removed to gain access to the inside of the upper hopper portion 16 as needed, such as, for example, to clear jammed feedstock out of, or otherwise service, the upper hopper portion 16.

Figure 3:
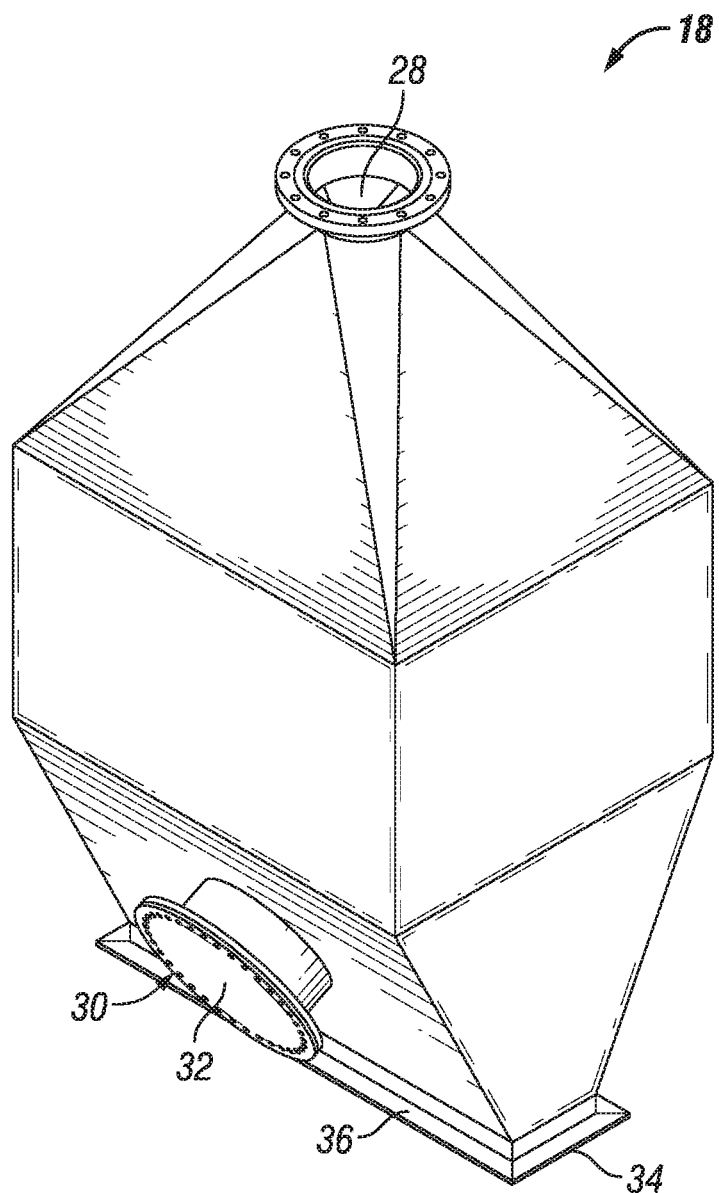
FIG. 3 is a perspective view of a lower portion of the infeed hopper of FIG. 1.

FIG. 3 shows a lower hopper portion 18, including an inlet 28 which, when the upper and lower hopper portions 16, 18 are combined, is associated with the sealing gate 20. The inlet 28 is used to receive feedstock into the lower hopper portion 18 from the upper hopper portion 16 when the gate 20 is in the open position. The lower hopper portion 18 further includes a lower access port 30 with a cover 32 that can be removed to gain access to the inside of the lower hopper portion 18 as needed, such as, for example, to clear jammed feedstock out of, or otherwise service, the lower hopper portion 18. The lower end 34 of the lower hopper portion 18 is configured for attachment to the meter 12, so that feedstock passes from the lower hopper portion 18 into the meter 12. In some embodiments, such as that shown in FIGS. 1 and 3, the lower end 34 of the lower hopper portion 18 may include a flange 36 that corresponds to a flange 38 of the meter 12. The flange 36 of the lower hopper portion 18 and the flange 38 of the meter 12 can be attached so that the lower end 34 of the lower hopper portion 18 aligns with the meter 12.

According to one possible process of the invention, feedstock can be introduced to a distillation chamber through the infeed hopper 10 and the meter 12. In such a process, feedstock, which may be coal, biomass, or some other carbon-based feedstock, is introduced into the upper hopper portion 16 thought the inlet 22 while the sealing gate 20 is closed. Thus, the upper hopper portion 16 can be filled without the feedstock passing into the lower hopper portion 18. Once a predetermined amount of feedstock has been inserted into the upper hopper portion 16, the inlet 22 of the upper hopper portion 16 can be closed and sealed.

Next, air may be purged from the upper hopper section 16. This may be accomplished, for example, by injecting nitrogen into the upper hopper section 16 and purging the air, such as through a vent. Purging the air from the upper hopper section 16 provides certain benefits to the system. For example, by purging the air, including oxygen in the air, from the upper hopper portion 16, such oxygen is prevented from progressing further into the system. This is desirable because if oxygen enters the distillation chamber downstream, oxidation could occur, leading to burning of the feedstock in the distillation chamber. This could ruin the feedstock, and also create a possible fire hazard.

Another step that may occur while the sealing gate 20 is closed and the feedstock is confined to the upper hopper portion 16, is to pressurize the upper hopper 16 so that the pressure is substantially equivalent to that in the lower hopper portion 18. Such pressurization of the lower hopper portion 18 occurs because the distillation chamber may be pressurized as part of the distillation process. Since the distillation chamber is open to the lower hopper chamber 18 via the meter 12, which is not airtight, any elevation in pressure inside the distillation chamber may lead to a corresponding pressure increase inside the lower hopper portion 18. If the sealing gate 20 were opened between the upper and lower hopper portions 16, 18 without first equalizing the pressures, such action could lead to a possible loss of pressure in the unit.

With the pressure in the upper hopper portion 16 adjusted to substantially match that of the lower hopper portion 18, the sealing gate 20 may be opened, at which point the feedstock in the upper hopper portion 16 can be gravity fed into the lower hopper portion 18 via the inlet 28 of the lower hopper portion 18. Thereafter, the sealing gate 20 may be closed, and the inlet to the upper hopper portion 22 may again be opened to receive more feedstock. Furthermore, from the lower hopper portion 18, the feedstock may pass through the meter 12, as described herein, and from there into the distillation chamber.

Figure 4A:
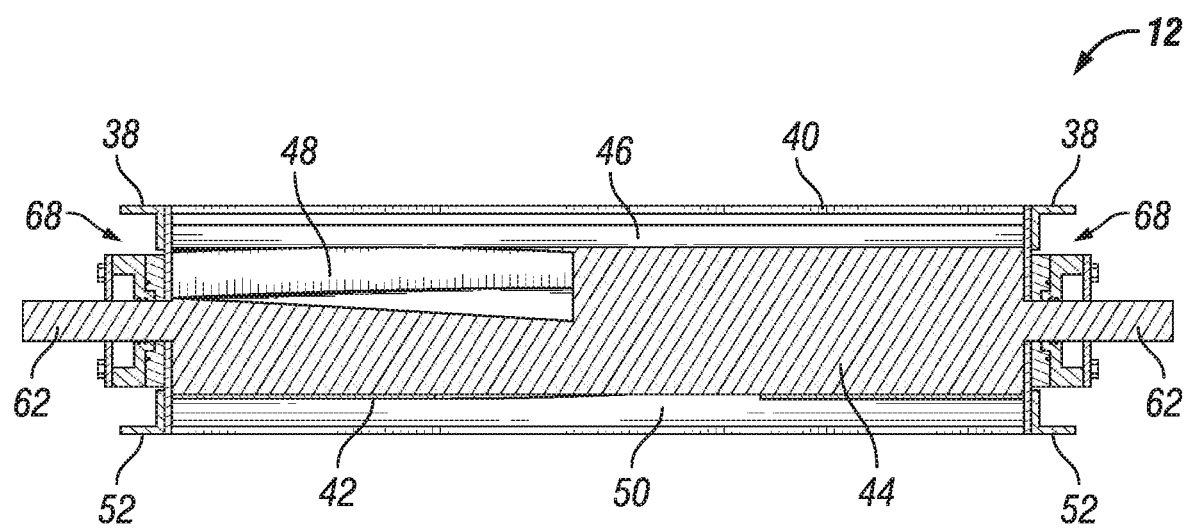
FIG. 4A is a side cross-sectional view of a meter assembly according to an embodiment of the present invention, taken along line 4A-4A of FIG. 1.
Figure 4B:
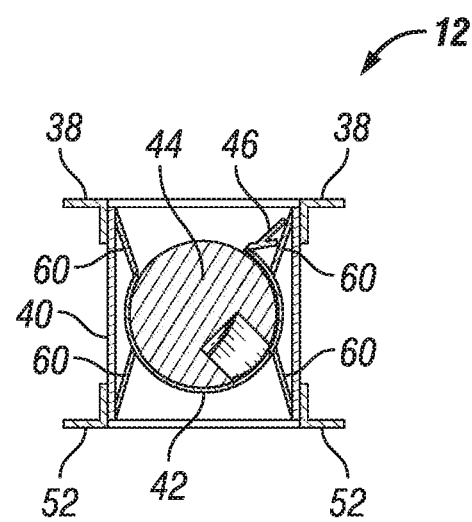
FIG. 4B is an end partial cross-sectional view of the meter assembly of claim 4A, taken along line 4B-4B of FIG. 1.

Referring now to FIGS. 4A and 4B, there are shown side and end cross-sectional views of the meter 12 according to an embodiment of the present invention. The meter 12 is an assembly that consists of a meter housing 40, a roller housing 42, a roller 44, and a wear plate 46. The roller 44 may have a helical recess 48, shown and described in more detail below. The roller housing may also have a helical opening 50 that corresponds to the helical recess 48 of the roller 44. The meter includes flanges 38 configured to correspond to flanges 36 of the bottom end 34 of the lower hopper portion 18, as shown in FIG. 1. Similarly, the meter 12 may have flanges 52 that correspond to flanges of a distillation chamber (not shown) at a bottom end of the meter 12. In practice, all feedstock must pass through the meter 12 to get from the lower hopper portion 18 to the distillation unit. As described below, the novel features and design of the meter 12 help to ensure that the feedstock is fed into the distillation unit at an even rate, and that the individual pieces of the feedstock are of a small enough size to avoid jamming the meter or other equipment. FIGS. 5A-8B depict the individual components of the meter 12, and fit together as shown in FIGS. 4A and 4B.

Figure 5A:
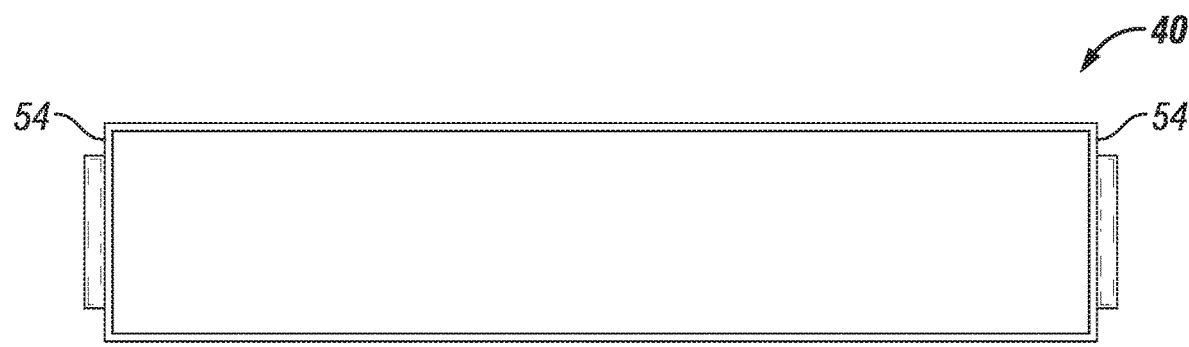
FIG. 5A is a top view of a meter housing according to an embodiment of the present invention.
Figure 5B:
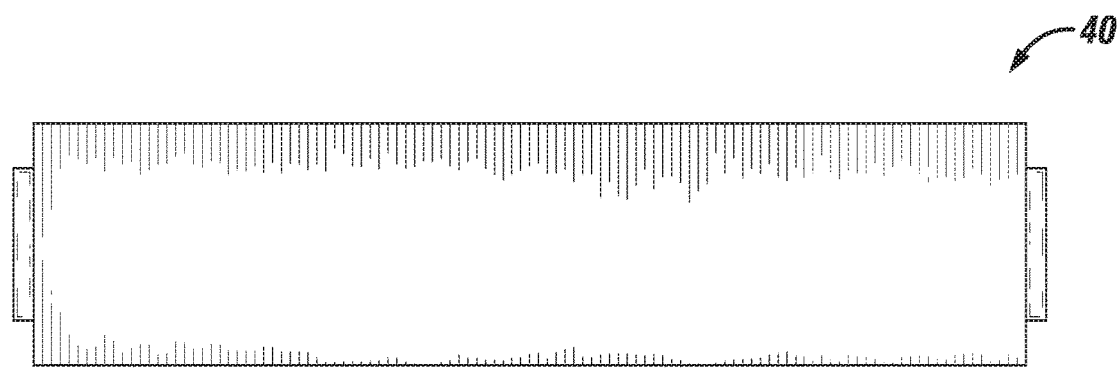
FIG. 5B is a side view of the meter housing of FIG. 5A.

FIGS. 5A and 5B show the meter housing 40 according to an embodiment of the present invention. The housing is at least partially open on the top and bottom, as shown in FIG. 5A. This allows feedstock to enter the meter 12 through the top, and then to exit the meter 12 through the bottom. The top and bottom may include transverse frame members 54 for support and to add strength to the meter housing 40. In FIG. 5A, the transverse frame members 54 are shown to be at the ends of the meter housing 40, but such frame members 54 could be located anywhere along the length of the meter housing 40. In addition, although only two frame supports 54 are shown, more frame supports 54 could be added to the meter housing 40. The sides of the meter housing 40, on the other hand, may be solid, to add rigidity and strength to the meter housing 40. Alternatively, although not shown, the sides could be open in places, but have a rigid framework sufficient to provide the support necessary for the meter housing 40.

Figure 6A:
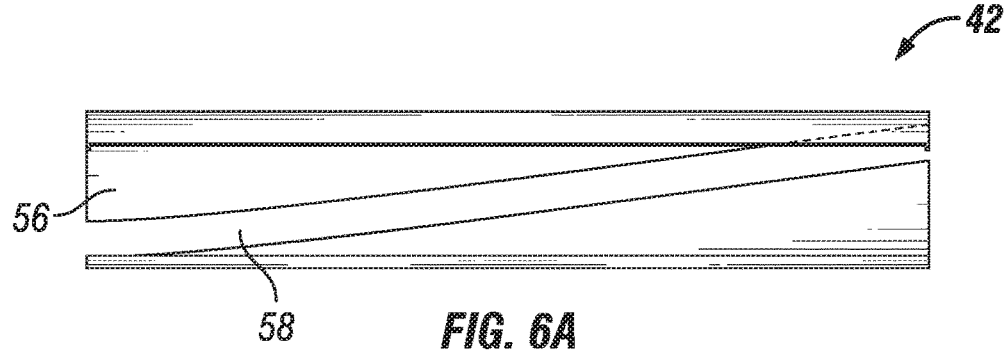
FIG. 6A is a top view of a roller housing according to an embodiment of the present invention.
Figure 6B:
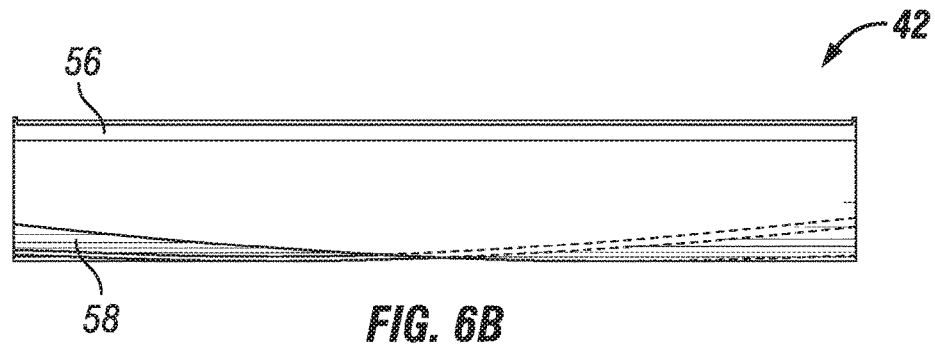
FIG. 6B is a side view of the roller housing of FIG. 6A.

FIGS. 6A and 6B show the roller housing 42 of the meter 12. The roller housing 42 has an open upper side 56 and an open lower side 58. Again, this is to allow passage of feedstock from the upper side of the roller housing 42 and out of the lower side of the roller housing 42. The roller housing 42 is rigidly fixed to the meter housing 40, as shown, for example, in FIG. 4B. As shown, in some embodiments, the roller housing 42 may be attached to the meter housing 40 with roller housing support members 60.

The open upper side 56 and open lower side 58 of the roller housing 42 may be of any appropriate configuration. For example, as shown in FIGS. 4B, 6A, and 6B, the open upper side 56 of the roller housing 42 may be broad, and have a width nearly as large as the diameter of the roller housing 42. Such an open upper side 56 may be advantage to help increase the amount of feedstock that passes through the roller housing 42 on the upper side thereof. As shown in FIGS. 6A and 6B, on the other hand, the open lower side 58 of the roller housing 42 may be smaller and have a helical shape. Such a helical shape may be configured to correspond to the helical recess 48 of the roller 44, so that feedstock can be discharged from the open lower end 58 of the roller housing 42 evenly into a distillation chamber, as discussed hereinbelow. Of course, the open lower side 42 of the roller housing 42 can alternatively have any configuration, including a broad longitudinal cut similar to the open upper side 56.

Figure 7A:
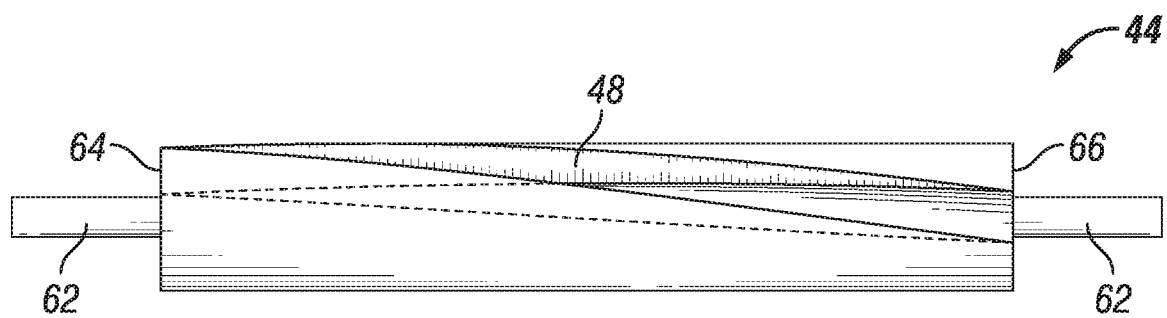
FIG. 7A is a side view of a roller according to an embodiment of the present invention.
Figure 7B:
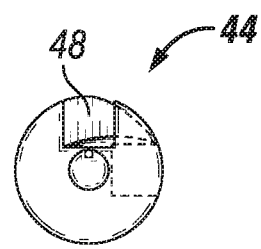
FIG. 7B is an end view of the roller of FIG. 7A.

FIGS. 7A and 7B show a roller 44, according to one embodiment of the present invention. One unique feature of the roller 44 shown in these figures is the helical recess 48 in the roller 44. As shown, the roller 44 includes a pin 62 aligned with the longitudinal axis of the roller 44. The helical groove 48 extends across the length of the roller 44, and curves across the length so that the cross-section of the recess 48 at the first end 64 is offset substantially 90 degrees from the cross-section of the recess 48 at the second end 66. The helical recess 48 has a depth sufficient to receive feedstock and convey the feedstock from the top of the meter 12 to the bottom of the meter 12.

In the assembly, as shown in FIGS. 4A and 4B, the roller 44 is positioned within the roller housing 42. The pin 62 of the roller 44 extends through the roller housing 42 and, in some embodiments, the meter housing 40. In practice, the roller 44 is turned within the roller housing 42 by turning the pin 62. In the example meter 12 depicted, the shaft turns on bearing assemblies 68 located at ends of the meter housing 40. The types of bearings used, and their positioning relate to the components 12 is not critical, so long as they are configured to allow the rotation of the roller 44 relative to the roller housing 42 and the meter housing 40. The tolerance between the roller 44 and the roller housing 42 is preferably small, such as about ⅛ of an inch or less, to prevent the passage of the materials, and minimize the passage of gas, between the roller 44 and the roller housing 42.

In practice, the roller 44 acts to convey feedstock through the meter 12 according to the following method. First, the feedstock is gravity fed from the lower hopper portion 18 into the top of the meter 12. Due to the open nature of the top of the meter housing 40, and the open upper side 56 of the roller housing 42, the feedstock is able to come into direct contact with the surface of the roller 44. Because of the tight tolerances, however, between the roller 44 and the roller housing 42, the feedstock is prevented from fitting between the roller 44 and the roller housing 42 except via the helical recess 48.

As the roller 44 turns, the helical recess 48 becomes exposed to the feedstock via the open top side 56 of the roller housing 42. Thus, the feedstock enters the helical recess 48. Thereafter, as the roller 44 continues to turn, the helical recess 48, now full of feedstock, rotates away from the open upper side 56 of the roller housing 42, and the feedstock within the helical recess 48 is conveyed toward the open lower side 58 of the roller housing. Once the helical recess 48 aligns with the open lower side 58 of the roller housing 42, the feedstock falls (via gravity) through the open lower side 58 and through a lower end of the meter housing 40 into the distillation chamber. Because the amount of feedstock that can be carried by the helical recess 48 is known, the amount of feedstock transmitted from the lower hopper portion 18 to the distillation unit can be calculated and controlled using the meter 12. In addition, use of the helical open lower side 58 of the roller housing 42, can help to ensure that all of the feedstock held in the helical recess 48, along the entire length of the roller 44, is dropped evenly and contemporaneously into the distillation chamber.

Figure 8A:
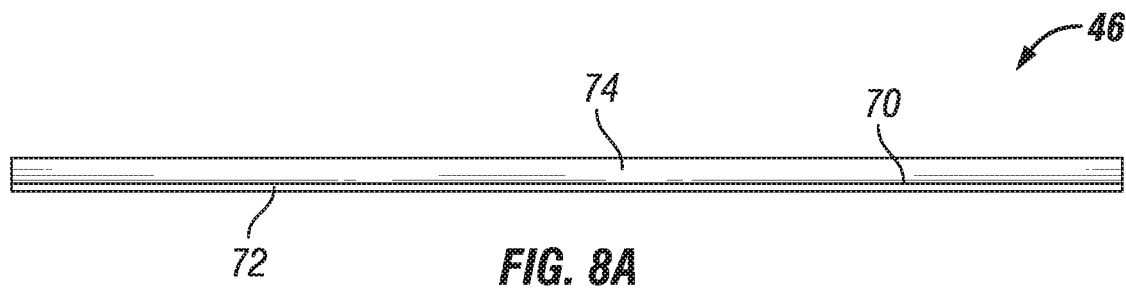
FIG. 8A is a side view of a wear plate according to an embodiment of the present invention.
Figure 8B:
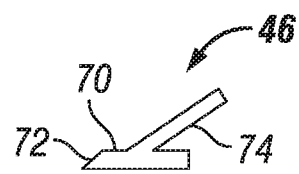
FIG. 8B is an end view of the wear plate of FIG. 8A.

FIGS. 8A and 8B shown a wear plate 46 used in the meter 12 to help control the size of individual pieces of feedstock that enter the distillation unit, and to cut down large pieces of feedstock that might otherwise jam the meter 12. The wear plate is an elongate plate as shown in FIG. 8A. The cross-section of the wear plate 46 includes a transverse base 70 that culminates in a sharpened edge 72. The cross-section of the wear plate 46 also includes an angled stem 74.

When positioned in the meter 12, as shown in FIG. 4B, the sharp edge 72 of the wear plate 46 is positioned adjacent the surface of the roller 44 and is rigidly attached to meter housing 40, the roller housing 42, and/or the roller housing support members 60. The sharp edge 42 is also positioned so that the roller 44 turns toward the sharp edge 72 of the wear plate 46.

In practice, as the roller turns, and particles of feedstock that are too large to fit into the helical recess 48 are pulled by the roller 44 into the sharp edge 72 of the wear plate 46. The sharp edge 72 of the wear plate 46 shears those particles to a smaller size. Furthermore, the helical shape of the recess 48, combined with the substantially straight edge 72 of the shear plate 46, combine so that when the recess 48 rotates toward the sharp edge 72, the confluence of the two features creates a wedge. As particles of feedstock become trapped in the wedge, they cannot easily be loosed, and are sheared by the sharp edge 72, whereas in the absence of such a wedge, the particles may bind up the meter.

Thus, the helical recess 48 is beneficial because it provides a means to help large particles of feedstock to be sheared, thereby avoiding jamming of the meter. Furthermore, the smaller feedstock particle size that results helps to avoid jamming of equipment down line from the meter as well, such as coolers used to cool the feedstock after it exits the distillation chamber.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A meter for controlling the flow of feedstock from an in-feed hopper to a distillation unit, the meter comprising:
    a cylindrical roller having a first end, a second end, and an outer diameter, the roller defining a recess that extends helically substantially from the first end to the second end;
    a sleeve circumscribing a portion of the outer diameter of the cylindrical roller, the sleeve having an open first side that allows the passage of feedstock into the recess of the roller, and an open second side that allows the passage of feedstock out of the recess of the roller as the roller rotates relative to the sleeve; and
    a housing fixedly attached to the sleeve and capable of attachment to the in-feed hopper and the distillation unit such that feedstock must pass through the housing to get from the in-feed hopper to the distillation unit, wherein the open second side of the sleeve comprises:
    a helical opening corresponding in shape and size to the helical recess of the roller so that when the recess of the roller aligns with the helical opening, the feedstock passes through the helical opening all at once into the distillation unit, to ensure that the feedstock held in the helical recess along the entire length of the roller is dropped evenly and contemporaneously into the distillation unit, and wherein
    the open first side of the sleeve is larger than the open second side of the sleeve.

2. The meter of claim 1, wherein the meter further comprises:
    a wear plate having substantially the same length as the roller, and attached to the housing so that an edge of the wear plate is proximate an outer diameter of the roller to shear feedstock extending out of the recess as the roller turns.

3. The meter of claim 1, wherein the distance between the outer diameter of the roller and the sleeve is about ⅛ of an inch or less to help prevent the flow of gases from the distillation unit to the in-feed hopper.

4. The meter of claim 1, wherein the recess in the roller has a bottom and two sides, and wherein the transverse cross-section of the recess is substantially U-shaped.

5. The meter of claim 1, wherein the recess in the roller has a bottom and two opposing sides, and wherein the sides of the recess slope outwardly away from one another from the bottom of the recess to the outside diameter of the roller.

6. The meter of claim 1, wherein the recess in the roller extends across a horizontal length of the roller and curves across the length so that the cross-section of the helical recess at the first end of the roller is offset substantially 90° from the cross-section of the helical recess at the second end.

* * * * *